(12) United States Patent
Quix

(10) Patent No.: US 9,849,749 B2
(45) Date of Patent: Dec. 26, 2017

(54) METHOD AND DEVICE FOR OPERATING A HEAT ACCUMULATOR IN A MOTOR VEHICLE

(71) Applicant: FORD GLOBAL TECHNOLOGIES, LLC, Dearborn, MI (US)

(72) Inventor: Hans Guenter Quix, Herzogenrath NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 14/734,118

(22) Filed: Jun. 9, 2015

(65) Prior Publication Data

US 2015/0360535 A1    Dec. 17, 2015

(30) Foreign Application Priority Data

Jun. 17, 2014  (DE) .......................... 10 2014 211 529

(51) Int. Cl.
| | | |
|---|---|---|
| *B60H 1/00* | (2006.01) | |
| *F01P 11/00* | (2006.01) | |
| *F01P 11/20* | (2006.01) | |

(52) U.S. Cl.
CPC ..... *B60H 1/00492* (2013.01); *B60H 1/00778* (2013.01); *F01P 2011/205* (2013.01)

(58) Field of Classification Search
CPC ............. B60H 1/00492; B60H 1/00778; F01P 2011/205; F01P 11/00; F02N 19/04; F02N 19/10; F02N 2200/023; F02N 2200/024; F02N 2200/045; F02N 2200/0811; F02N 2300/2002; F02N 2300/2006; F01M 5/02; F01M 5/001; F01M 5/005; F01M 5/021;

(Continued)

(56) References Cited

U.S. PATENT DOCUMENTS 3,640,457 A * 2/1972 Colinet .............. B60H 1/00042
                                                    237/12.3 B
3,853,270 A * 12/1974 Prebil ................ B60H 1/00492
                                                    123/142.5 R (Continued)

FOREIGN PATENT DOCUMENTS

DE         19512821 A1 * 11/1995 ......... B60H 1/00492
DE     102012006632 A1 * 10/2013 .............. F28F 27/02

(Continued)

OTHER PUBLICATIONS

German Examination Report for corresponding Application No. 10 2014 211 529.9, dated May 22, 2015, 4 pages.

*Primary Examiner* — Thomas Moulis
*Assistant Examiner* — John Bailey
(74) *Attorney, Agent, or Firm* — Greg P. Brown; Brooks Kushman P.C.

(57) ABSTRACT

A method and a device for operating a heat accumulator in a motor vehicle are provided. When the driver switches off the ignition, it is determined on the basis of the current coolant temperature whether there is a need for heat accumulation at this time and whether the benefit thereof depends on when the internal combustion engine is activated again. If the response to both of these is positive the driver is requested to state whether heat accumulation is to be carried out now. Heat accumulation is carried out or is not carried out depending on the driver's response.

18 Claims, 1 Drawing Sheet

(58) Field of Classification Search
CPC ............ F01M 5/025; F01M 2005/026; F01M 2005/028
USPC ......... 123/41.14, 41.05, 41.13, 41.53, 41.55, 123/41.71, 179.3, 179.16; 237/12.2; 290/18; 322/38, 39; 184/104.2, 6.3
See application file for complete search history.

(56) References Cited

U.S. PATENT DOCUMENTS

| | | | | |
|---|---|---|---|---|
| 4,027,631 A | * | 6/1977 | Lavery | ...................... F22B 3/06 122/26 |
| 4,305,354 A | * | 12/1981 | Majkrzak | ................ F02N 19/02 123/142.5 R |
| 5,884,587 A | * | 3/1999 | Ichihara | ............. B60H 1/00878 123/41.01 |
| 6,109,229 A | * | 8/2000 | Pels | ........................ B60L 1/02 123/179.21 |
| 6,206,084 B1 | * | 3/2001 | Wieszt | ............... B60H 1/00492 165/11.1 |
| 6,612,504 B2 | * | 9/2003 | Sendzik | ..................... B63J 2/14 165/41 |
| 6,732,941 B2 | * | 5/2004 | Homan | .............. B60H 1/00735 165/41 |
| 6,810,977 B2 | * | 11/2004 | Suzuki | ................... B60K 6/365 123/41.14 |
| 7,007,856 B2 | * | 3/2006 | La Falce | ................ B60H 1/322 165/41 |
| 8,006,655 B2 | * | 8/2011 | Hiyama | ............. B60H 1/00314 123/41.08 |
| 8,628,025 B2 | * | 1/2014 | Bucknell | ................... F01N 5/02 123/41.21 |
| 9,347,717 B2 | * | 5/2016 | Baruschke | .............. F28F 27/00 |
| 2002/0005178 A1 | * | 1/2002 | Iwatani | .................. F01M 5/021 123/41.14 |
| 2002/0011221 A1 | * | 1/2002 | Suzuki | ............... B60H 1/00492 123/41.14 |
| 2002/0144667 A1 | * | 10/2002 | Ito | ............................ F01P 11/20 123/179.3 |
| 2002/0195068 A1 | * | 12/2002 | Ichinose | ................... F01P 3/20 123/41.1 |
| 2007/0062745 A1 | * | 3/2007 | Gebert | ..................... B60K 6/48 180/65.245 |
| 2009/0071428 A1 | * | 3/2009 | Kamiyama | ........ B60H 1/00314 123/142.5 R |
| 2009/0236435 A1 | * | 9/2009 | Kudo | ....................... F01P 11/20 237/12.3 B |
| 2009/0241863 A1 | * | 10/2009 | Kimura | .................. B60H 1/025 123/41.1 |
| 2010/0186685 A1 | * | 7/2010 | Hiyama | ............. B60H 1/00314 123/41.08 |
| 2013/0142669 A1 | * | 6/2013 | Pyle | ........................ F01P 7/164 417/12 |
| 2014/0223950 A1 | * | 8/2014 | Janeling | ................ B60H 1/005 62/333 |
| 2015/0060559 A1 | * | 3/2015 | Kappner | .................. F28F 27/02 237/12.4 |
| 2015/0360535 A1 | * | 12/2015 | Quix | .................. B60H 1/00492 237/8 A |

FOREIGN PATENT DOCUMENTS

| | | | | |
|---|---|---|---|---|
| JP | 2008133755 A | * | 6/2008 | ........ B60H 1/00314 |
| JP | 2011106300 A | * | 6/2011 | ......... B60H 1/00492 |

* cited by examiner

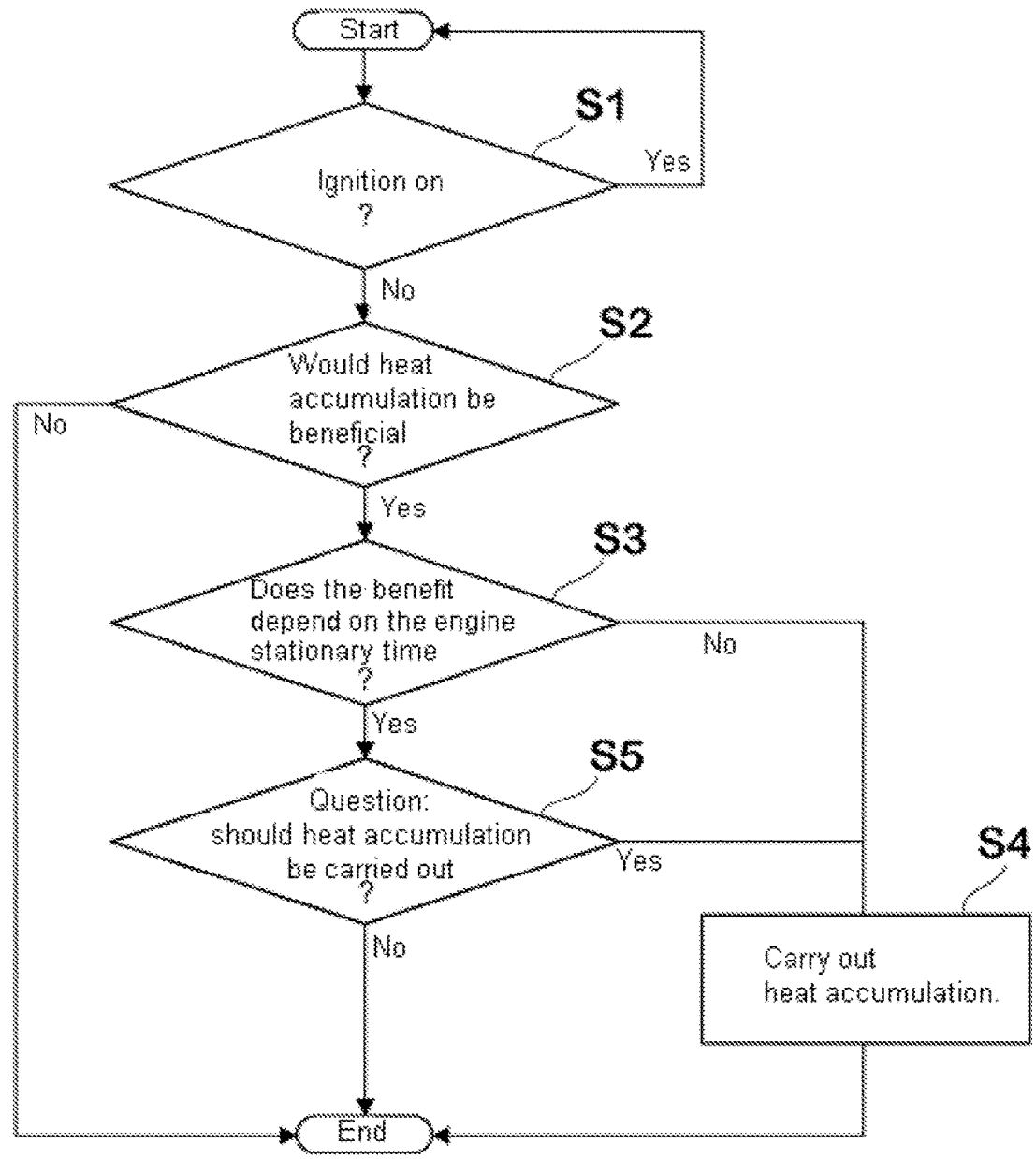

METHOD AND DEVICE FOR OPERATING A HEAT ACCUMULATOR IN A MOTOR VEHICLE

CROSS-REFERENCE TO RELATED APPLICATIONS

This application claims foreign priority benefits under 35 U.S.C. §119(a)-(d) to DE 10 2014 211 529.9 filed Jun. 17, 2014, which is hereby incorporated by reference in its entirety.

TECHNICAL FIELD

The invention relates to a method and to a device for operating a heat accumulator in a motor vehicle.

BACKGROUND

In motor vehicles, a heat accumulator for the heat which is contained in the coolant, which the heat accumulator is embodied, for example, as a coolant accumulator or latent heat accumulator and can hold the heat stored therein for, for example, at least 24 hours permits savings in fuel consumption and correspondingly lower emissions of pollutants. The heat which is stored in the heat accumulator during travel and/or at the end of travel is used to return the internal combustion engine as quick as possible to its operating temperature when it is activated again, which significantly reduces the frictional losses in the engine and permits a fuel/air mixture to be generated which is optimum in terms of fuel consumption. The stored heat can also be used to heat quickly other vehicle components such as, for example, the vehicle battery and/or the passenger compartment of the vehicle.

DE 195 12 821 A1 discloses a method for operating a heat accumulator in a motor vehicle, in which the heat accumulator is charged with the available heat at the latest when the ignition is switched off. This contributes to the heat contained in the coolant being charged into the accumulator and discharged again later with the greatest possible efficiency.

DE 10 2012 006 632 A1 discloses a method for operating a heat accumulator in a motor vehicle, in which the thermal coupling between the heat accumulator and the heat sinks which are fed thereby occurs as a function of a distance which is still to be covered by the vehicle.

A motor vehicle heat accumulator is typically charged in small increments as soon as the coolant has reached relatively high temperatures or when excessive heat energy is available. This is the case when the thermostat temperature of the engine cooling system at which the coolant is permitted to circulate through the radiator is reached or almost reached.

During short journeys or at low ambient temperatures, the coolant temperature possibly does not reach more than 70° C. As long as the coolant temperature is still relatively low, it is unfavorable to charge the heat accumulator because all the heat is required for the further heating of the internal combustion engine and, if appropriate, for heating the passenger compartment of the vehicle.

If, in such a case, the internal combustion engine is deactivated by switching off the ignition and the vehicle is left in a stationary state, it is also possibly uneconomical now to charge the heat contained in the coolant into the accumulator. This depends on the period of time for which the vehicle remains non-operational. For relatively short stationary times of, for example, less than an hour, heat accumulation is uneconomical because the losses of the heat exchange process are greater than the benefit of the heat accumulation.

It would be possible to consider allowing the heat exchange process to start automatically only a certain time after the ignition has been switched off, but up to then heat would be lost into the surroundings, with the result that the heat accumulation would have less benefit.

SUMMARY

The invention is based on the object of specifying a particular economical method for operating a heat accumulator in a motor vehicle.

This object is achieved on the basis of a method and a device configured for carrying out the method.

According to the invention, when the driver switches off the ignition, it is determined on the basis of the current coolant temperature whether there is a need for heat accumulation at this time and whether the benefit thereof depends on when the internal combustion engine is activated again. If the response to both of these is positive the driver is requested to state whether heat accumulation is to be carried out now, and heat accumulation is now carried out or is not carried out depending on the driver's response.

In this context, the benefit of the heat accumulation is assessed at least with respect to the lowest possible fuel consumption, preferably also with respect to the lowest possible emissions of pollutants and optionally also with respect to driving comfort.

With the invention, the heat accumulator can be used in an optimum way without any complicated devices and strategies for managing the heat accumulator being necessary. Furthermore, the strategy according to the invention is perfectly simple and understandable to the driver, and therefore also tends to be accepted.

The invention is based on the realization that many drivers like to play an active role in the selection of possible energy saving measures, and that active participation in the saving of energy is not at all unpleasant for such drivers. Many drivers even love to utilize the energy saving possibilities which are provided to them by a modern motor vehicle which is configured to consume as little fuel as possible and emit as few pollutants as possible, and to utilize these possibilities to the greatest possible extent.

Drivers who do not like this can be provided with a possibility of never carrying out the inventive interrogation or only carrying it out under certain circumstances, in which case any other heat accumulation strategy can be implemented without the participation of the driver.

In one preferred embodiment of the invention, the stationary time of the motor vehicle from when heat accumulation would now be beneficial is also determined and communicated, for example visually or acoustically to the driver, in order to lower the fuel consumption and the emissions of pollutants.

The determination as to whether the economicalness of heat accumulation at the time of the switching off of the engine depends on when the internal combustion engine is activated again is preferably also performed on the basis of the heat currently stored in the heat accumulator, and preferably also on the basis of the current ambient temperature, because the internal combustion engine and the coolant then cool down more quickly.

If the abovementioned determination reveals that heat accumulation would not be beneficial now, the heat accumulation is not carried out, and if the determination reveals that heat accumulation would certainly be beneficial now, the heat accumulation is carried out. In both cases, the driver is also not subsequently interrogated.

There follows a description of an exemplary embodiment on the basis of the drawing.

BRIEF DESCRIPTION OF THE DRAWINGS

The FIGURE is a flow chart of part of a method for operating a heat accumulator in a motor vehicle.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In a motor vehicle with an internal combustion engine, and, for example, a latent heat accumulator for the heat contained in the coolant, after an engine start it is continuously checked whether the ignition is still switched on (S1).

If it is detected that the driver has switched off the ignition, it is determined on the basis of the current coolant temperature in the engine, the heat currently stored in the heat accumulator and the ambient temperature whether heat accumulation would be beneficial at this time (S2), and if this is the case whether the benefit thereof depends on when the internal combustion engine is activated again (S3). If it is not the case in step S2 the method is ended without heat accumulation. If it is not the case in step S3, heat accumulation is carried out now or a preset short time afterwards (S4).

If it is the case in step S3, the driver is requested to state whether or not heat accumulation is to be carried out now (S5). The request can be made, for example, in the form of a text display on a display device on the dashboard, which text display can read, for example: "If the journey is not continued in the next 35 minutes heat accumulation would be beneficial. Would you like to store the thermal energy?"

If the driver confirms this in any way, the heat accumulation is carried out (S4), and if he signals that heat accumulation is not to be carried out, it is not carried out and the method is ended.

If the driver does not react at all to the text display, any preset, very simple heat accumulation strategy can be carried out. For example, in this case heat accumulation can be carried out if the current coolant temperature is above a preset value, and otherwise it is not carried out.

While exemplary embodiments are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments of the invention.

What is claimed is:

1. A method for operating a heat accumulator in a motor vehicle, wherein when a driver switches off an ignition, determining on a basis of a current coolant temperature (i) whether heat accumulation is needed at this time and (ii) whether a benefit thereof depends on when an internal combustion engine is activated again, wherein if both (i) and (ii) are positive, requesting the driver to state whether heat accumulation is to be carried out now, and wherein heat accumulation is carried out or is not carried out depending on the driver's response to the request.

2. The method as claimed in claim 1, wherein the benefit of the heat accumulation is assessed with respect to fuel consumption, emissions of pollutants and/or driving comfort.

3. The method as claimed in claim 1, wherein a stationary time of the motor vehicle from when heat accumulation would now be beneficial is also determined and communicated to the driver.

4. The method as claimed in claim 1, wherein the determination is also based on heat currently stored in the heat accumulator and/or the current ambient temperature.

5. The method as claimed in claim 1, wherein the driver is provided with a possibility of setting that the request for communication as to whether heat accumulation is to be carried out is expressed always, never or only under certain circumstances.

6. The method as claimed in claim 1, wherein if the determination reveals that heat accumulation would not be beneficial now, the heat accumulation is not carried out and the driver is not interrogated.

7. The method as claimed in claim 1, wherein if the determination whether heat accumulation is needed at this time reveals that heat accumulation would now be beneficial irrespective of when the internal combustion engine is activated again, heat accumulation is carried out without interrogating the driver.

8. A method for operating a heat accumulator in a vehicle comprising:
carrying out heat accumulation after receiving confirmation from a driver's response to a request regarding whether heat accumulation is to be carried out presently, the request made based on a present coolant temperature after an ignition is switched off when heat accumulation is presently needed and when a heat accumulation benefit depends on when an engine is reactivated.

9. A method for operating a heat accumulator in fluid communication with a coolant system of an internal combustion engine in a vehicle comprising:
(i) in response to an ignition being switched off, determining if heat accumulation is presently beneficial based on a current coolant temperature in the engine, heat currently stored in the heat accumulator, and an ambient temperature;
(ii) determining if a heat accumulation benefit is dependent on when the engine is reactivated based on a period of time that the vehicle is to remain non-operational;
(iii) requesting a driver to confirm if heat accumulation is to be carried out now; and
(iv) carrying out heat accumulation in the heat accumulator in response to the driver confirming the request.

10. The method of claim 9 further comprising carrying out heat accumulation in the heat accumulator within a preset time when the heat accumulation benefit is independent of when the engine is reactivated based on the period of time that the vehicle is to remain non-operational.

11. The method of claim 9 further comprising displaying the request to the driver on a display device in the vehicle.

12. The method of claim 9 further comprising carrying out heat accumulation in the heat accumulator in response to the driver not reacting to the request if the current coolant temperature is above a preset value.

13. The method of claim 9 further comprising determining a state of the ignition.

14. The method of claim 9 wherein step (i) is further based on at least one of fuel consumption, emissions of pollutants, and driving comfort.

15. The method of claim 9 further comprising determining the period of time that the vehicle is to remain non-operational; and communicating the period of time to the driver.

16. The method of claim 9 further comprising ending without heat accumulation in response to a negative determination from at least one of steps (i), (ii), and (iii).

17. The method of claim 9 wherein step (iii) is performed in response to a positive determination from steps (i) and (ii).

18. The method of claim 9 wherein steps (i), (ii), (iii), and (iv) are performed sequentially.

* * * * *